SECRET CARRIER SIGNALING METHOD AND SYSTEM

Filed Aug. 20, 1946

INVENTOR
K. L. KING
BY
Robert J. Pluskey
ATTORNEY

Patented Nov. 21, 1950 2,530,824

UNITED STATES PATENT OFFICE 2,530,824

SECRET CARRIER SIGNALING METHOD AND SYSTEM

Kenneth L. King, Mountain Lakes, N. J., assignor to Bell Telephone Laboratories, Incorporated, New York, N. Y., a corporation of New York Application August 20, 1946, Serial No. 691,853

10 Claims. (Cl. 179—1.5)

This invention relates to signaling systems, and, more particularly, to such systems wherein provision is made for maintaining secrecy in the transmission of messages thereon.

In the past, various provisions have been made for maintaining secrecy of the transmitted message. These have included inversion of the frequency components of the message wave in relation to the carrier or modulated wave, the suppression of the carrier wave, the transmission of a "false," misleading or otherwise confusing carrier wave, use of a carrier wave that is varied in frequency during transmission, and changing the message wave's position with respect to the carrier wave either by raising or lowering it in the sideband spectrum, or changing it from one sideband to the other during transmission. In addition, other systems have employed various arrangements whereby noise or similar components are introduced for masking the true character of the speech waves.

It is an object of this invention to render messages transmitted by a signaling system unintelligible to unauthorized recipients.

It is a further object to achieve this privacy through the use of simple economical means and method that may be readily incorporated in the design of such a system.

The present invention utilizes the principle of altering the message wave by a modulation process, and transmitting one sideband product and a false carrier wave. The frequency of the false carrier wave is intermittently changed from one to the other of two values while the transmitted sideband simultaneously alternately assumes the position of an upper or lower sideband with respect to the transmitted carrier wave but in either of which positions the frequencies of the message wave are in an inverted condition.

It is a further feature of this invention that a signaling system arranged in accordance with this invention may nevertheless be used for telegraphic communications in a conventional or known manner.

Other objects and features of the invention will be evident from the general and detailed description that follows.

Figure 1:
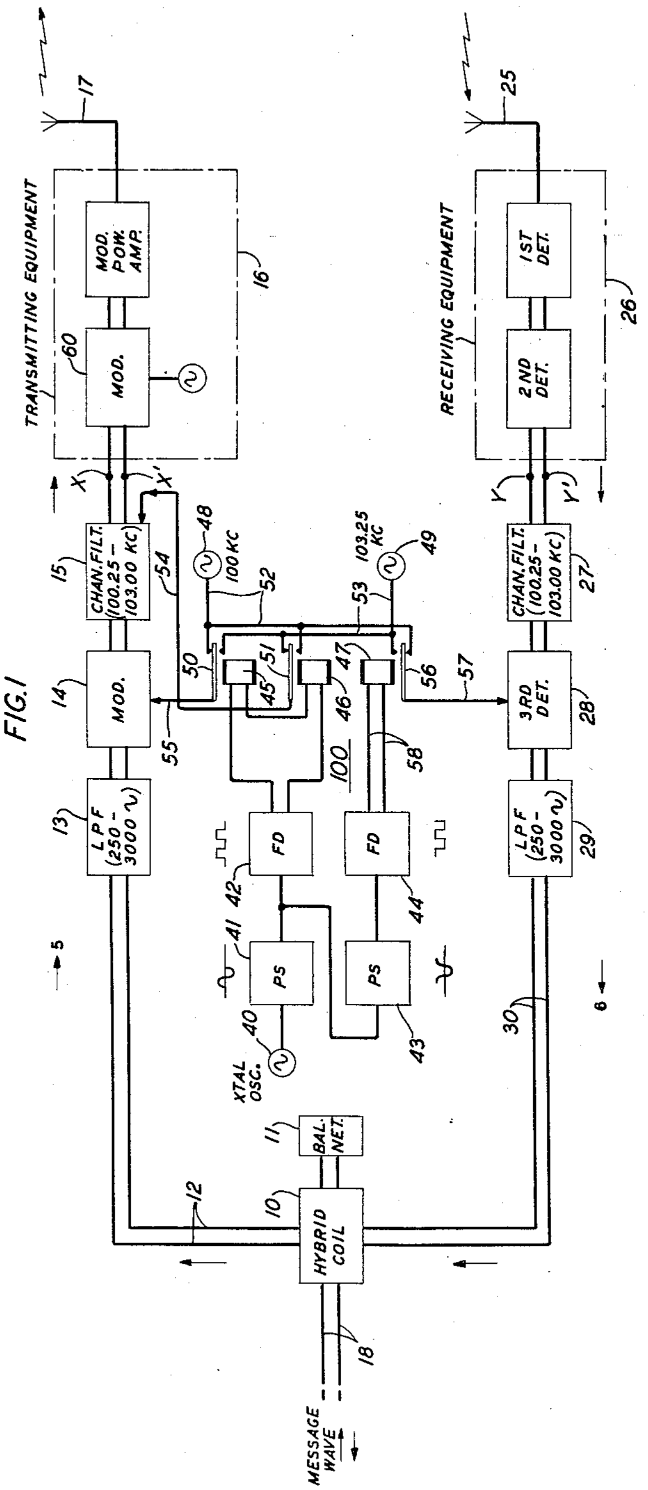
Figure 2:
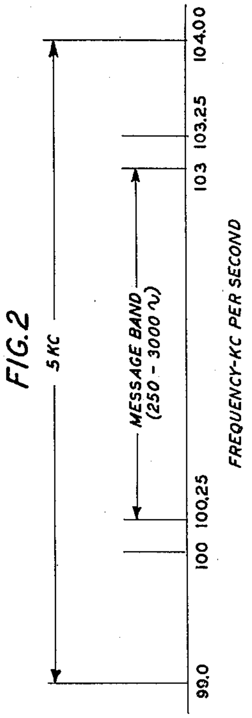

The manner in which the invention accomplishes the specifically mentioned and other desirable objectives may be more readily understood when considered with reference to the accompanying drawing in which:

Fig. 1 shows, in block diagram form a circuit arrangement embodying the principles of the invention arranged for use in a single sideband radio system; and Fig. 2 illustrates the position of the message band relative to two assumed carrier frequencies.

For purposes of illustration, the invention is being disclosed as embodied in a radio frequency transmission system, shown in schematic form by Fig. 1. It comprises a one-way or transmitting path or circuit 5, a second one-way or receiving path or circuit 6, and a frequency source and control circuit, designated generally by the symbol 100.

The path 5 comprises a voice frequency or low-pass filter 13, a modulator 14; a radio frequency channel or band-pass filter 15; a conventional radio frequency transmitting equipment 16, including a modulator 60; and a radio frequency wave radiator or antenna 17. The path 6 comprises a radio frequency wave receptor or antenna 25; conventional radio frequency receiving equipment 26, including a first and a second detector; a radio frequency channel or band-pass filter 27; a detector or demodulator 28; and a voice frequency or low-pass filter 29. The paths 5, 6 are interconnected with a voice frequency transmission line 18, over lines 12, 30, respectively, through the well-known hybrid coil and balancing network combination 10, 11.

Carrier frequency waves, required in accordance with the invention, are supplied to the paths 5, 6 from the circuit 100. The latter comprises a control oscillator 40; phase shifting networks 41, 43; frequency divider networks 42, 44; control relays 45, 46, 47; and suitable current paths or lines for interconnecting the recited components of the control circuit with one another and the control circuit with the transmitting and receiving paths.

Referring to Fig. 1, the message wave is transmitted by way of the interconnecting circuit 18 from the message source (not shown), for example, voice frequency terminating equipment, to the conventional hybrid coil 10 and its associated balancing network 11, where it is directed to connecting circuit or line 12 and the input filter 13. The input filter 13 is a so-called low-pass filter offering little attenuation to frequencies between 250 and 3000 cycles per second and offering much greater attenuation to frequencies above 3000 cycles per second. The specific frequency band, i. e., 250–3000 cycles per second, has been selected for illustrative purposes. Obviously, the invention is not so limited. The filter may be of any conventional type employing inductive and capacitive elements, with or without a crystal element as may be desired. The filtered message wave is passed from the output of the low-pass filter 13 to the modulator 14, which may be of the conventional balanced type using either vacuum tubes or non-linear impedance elements, where it is combined with the carrier current supplied from oscillator 48 or 49. The carrier current that is being supplied to the modulator 14 at any particular instant depends upon the operation of relays 45 and 46.

The crystal oscillator 40 controls the switching function that determines which of the two carrier frequencies obtained from oscillators 48 and 49, shall be modulated and suppressed, and which shall be transmitted as a false carrier wave. This oscillator may be any of several well-known types of crystal-controlled precision oscillators. The oscillator's sine wave output is connected to the phase shifter 41 providing a convenient arrangement for adjusting the wave phase through a complete cycle to facilitate synchronizing adjustments between the sending and receiving apparatus. Because precision control of oscillators may be more easily achieved at frequencies greater than voice frequencies, and because a suitable rate for switching the carrier frequencies is approximately four times a second, the frequency divider 42 is provided to effect the reduction in control frequency. This frequency divider may be any of several well-known designs, one type of which comprises tandem-connected stages of multivibrators. In such an arrangement, each multivibrator is controlled by its preceding stage, and reverses at a rate corresponding to a submultiple of the reversing rate of its controlling stage. The actual arrangement required to perform the frequency division will, of course, depend upon the frequency chosen for the crystal control oscillator 40, and the number of carrier flip-flops or switches per second that are desired. In the embodiment being described herein, the relays 45 and 46 are substantially identical relays having their coil windings in series connection, so that their respective relay armature contacts 50 and 51 operate substantially in unison. Each relay has two stationary contacts so arranged that a conductive circuit is made through the relay armature contact and one of its two associated stationary contacts, regardless of whether the armature is in its attracted (operated) or released (non-operated) position. During periods when no positive voltage pulses are being delivered from the frequency divider 42, the relay armature contacts 50 and 51 will be in the released (non-operated) position, as shown. Carrier current of a suitable frequency, for example, 100 kilocycles per second, is delivered by the oscillator 48 to the modulator 14 by way of circuits 52 and 55 and armature contact 50. In accordance with the well-known modulation action resulting from the proper combination of a carrier frequency wave of 100 kilocycles per second and a message wave comprising frequencies of 250 to 3000 cycles per second, there will be produced modulation products comprising, among others, an upper sideband of 100.25–103.0 kilocycles per second and a lower sideband of 97.0–99.75 kilocycles per second. Of these products, only the upper sideband of 100.25–103.0 kilocycles per second is in the proper frequency range to be passed by the channel filter 15, which may be any type of sharp cutoff band-pass filter, a number of varieties of which are described by W. P. Mason in "Electromechanical Transducers and Wave Filters," published in 1942 by D. Van Nostrand Company of New York.

During this same interval, the relay 46 is unoperated, and a conductive circuit is thereby provided for the 103.25-kilocycle frequency from the oscillator 49. This circuit is through connecting paths 53 and 54 and armature contact 51 to the output of the channel filter 15 where the 103.25-kilocycle frequency joins the upper sideband modulation product of 100.25–103.0 kilocycles per second. This combination of frequencies is then introduced into the modulator 60 of the radio transmitting equipment 16. At this point it should be noted that although the 103.25-kilocycle frequency is unmodulated, and would appear to be the unmodulated component of one of the frequencies that produced the upper sideband of 100.25–103.0 kilocycles per second, such is not the case. This sideband when combined therewith will not reproduce the original message wave, but will produce a wave in which the frequency components are in an inverted position or inverted disposition with respect to their original position. The 100.25-kilocycle component that originally arose from combining the 250-cycle portion of the message wave with the 100-kilocycle carrier will, if detected with the 103.25-kilocycle unmodulated component, produce a frequency of 3000 cycles per second and similarly for other frequencies throughout the band.

When the frequency divider 42, as controlled by the crystal-controlled oscillator 40, reverses its operation and delivers a positive voltage supply to the windings of relays 45 and 46, thereby simultaneously causing the relay armatures to be attracted (or operated), the armature contacts 50 and 51 break their previous contacts with conductors 52 and 53, respectively, and make contacts with these conductors in reversed fashion, that is 53 and 52, respectively. This reversal of contact reverses the functions of the oscillators 48 and 49. Oscillator 48 now supplies 100-kilocycle frequency to the output of the channel filter 15 for combination with the sideband product of modulation. Oscillator 49 now supplies 103.25-kilocycle carrier wave to modulator 14, wherein sideband products of 100.25–103.0 kilocycles per second and 103.5–106.25 kilocycles per second, corresponding to lower and upper sidebands respectively, are produced. In this instance, the lower sideband of 100.25–103.0 kilocycles per second is passed by the channel filter 15 to become merged with the 100-kilocycle unmodulated component for further modulation in the transmitting equipment 16. It should again be noted that the modulated component now occupies the relative position of an upper sideband with respect to the unmodulated component, but in which the frequency relations are again in inverted relation to the original message wave.

The frequency relation between the two carrier wave frequencies, the message wave frequencies and the pass band of the channel filter 15 is more clearly illustrated by Fig. 2 of the drawing. From this illustration it may be seen that only the upper sideband of 100 kilocycles per second and the lower sideband of 103.25 kilocycles per second are in position to be accepted by the filter 15. From the foregoing, it may be seen that a composite wave is radiated from the transmitting antenna 17, which wave contains a modulated and an unmodulated component and which components appear to bear the relation of a carrier current and its sideband, with the latter alternately switching or charging over from an upper to a lower sideband position and in which, in either position, the frequencies of the sideband are in inverted disposition.

The functioning of the receiving apparatus at the distant station is illustrated by the receiving apparatus shown in the drawings as being associated with the above-described transmitting system since the transmitting and receiving apparatus organizations at the two ends of a transmission channel are alike.

At the distant station, the incoming message wave is delivered by the receiving antenna 25 to the radio receiving equipment 26. At the output of the second detector, corresponding to the input to the channel filter 27, there will exist a complex wave that is the counterpart of the complex wave that was applied to the input of the modulator 60 of the transmitting radio equipment 16. Channel filter 27 is substantially the same as the transmitting channel filter 15, having as nearly as possible the same pass band and transmission characteristics. The third detector 28 is a demodulating unit which may be the same type as the modulator 14. The low-pass filter 29 may be the same as the transmitting low-pass filter 13.

Demodulating carrier current is supplied to the third detector 28 from the carrier current sources 48 and 49 by way of conductor 57, the relay armature contact 56 and either of the connecting circuits 52 and 53, depending upon the operated or unoperated condition of the receiving relay 47. This relay is controlled in its operation by the crystal-controlled oscillator 40, phase shifters 41 and 43, and the frequency divider 44 in the same manner as were relays 45 and 46 in the transmitting circuit. The phase shifter 43 operates from the output of the phase shifter 41 to introduce a suitable delay in the operation of the receiving relay 47, to permit synchronizing the switching operation of the demodulating carrier current with the received wave. The phase shifter 43 may be a duplicate of its preceding unit 41, its principal criterion being the capability of imparting an adjustable time delay that is sufficient to compensate for the time delay imparted to the received message during transmission and by the receiving channel filter circuits.

Assume, for example, that a complex wave comprising 100-kilocycle unmodulated carrier current and a sideband product comprising frequencies between 100.25–103.00 kilocycles per second is present at the input to channel filter 27. The filtering action of this unit will pass the sideband product, and suppress or greatly attenuate the unmodulated 100-kilocycle component. The passed sideband, having been originally derived as a lower sideband product of modulation wherein a carrier current of 103.25 kilocycles per second was used, is recombined with 103.25-kilocycle wave in the third detector 28 to recover the original message wave of frequencies 250 to 3000 cycles per second. Incorrect synchronization, if any, in the switching of the demodulating carrier wave frequencies will become immediately apparent, as it gives rise to inversion in the frequency relations within the message wave and consequent unintelligiblity. The demodulating carrier current is substantially suppressed in the balanced circuit of the third detector 28, and further discrimination against this frequency is presented by the low-pass filter 29. The detected message wave proceeds by way of interconnecting circuit or line 30, the hybrid coil 10 and circuit 18 to the voice frequency terminating equipment (not shown).

In the foregoing description, no division of time has been specified for the use of the two carrier wave frequencies. Under most circumstances equal use of the two frequencies for modulation purposes is probably desirable. This use would correspond to a case where the frequency dividers 42 and 44 produced high and low voltage pulses of equal time duration. If it should be deemed desirable to make use of these frequencies for unequal periods, the change may be easily made by unbalancing the frequency divider by the desired amount. If the multivibrator type of frequency divider is used, this result will be achieved by suitably regulating the conductive period of each half of the multivibrator.

It should be appreciated from the above detailed description that the simultaneous use of carrier telegraph or similar signals over the described system is not precluded. This is indicated in Fig. 2, wherein a 5-kilocycle band width is assumed for the transmission channel. These telegraph signals may be operated between either or both of the carrier frequencies and the channel frequency boundaries. Referring to Fig. 1, such service would be connected to the system at points X—X' and Y—Y' between the channel filters 15 and 27 and the respective transmitting and receiving equipments 16 and 26.

Although this invention has been described with reference to a specific application, it should be understood that it is not to be considered as limited thereto, since other applications thereof, not departing from the spirit and scope of the invention, will readily occur to the skilled in the art to which the invention pertains.

What is claimed is:

1. In a single sideband signaling system including a source of message waves and sources of carrier frequency waves, means for attaining secrecy of transmission which comprises, means for modulating a carrier wave by a message wave comprising a band of frequencies to produce upper and lower sidebands, means for alternately changing the frequency of the carrier wave by such an amount that the upper sideband produced when the carrier wave has one of its two frequencies occupies substantially the same frequency band as is occupied by the lower sideband produced when the carrier wave has the other of its two frequencies, a common selecting means selective only of wave frequencies in said last-mentioned band, and means for adding to the selected outgoing wave an unmodulated wave of the same frequency as that one of the two frequencies possessed by the carrier wave concurrently not being modulated, so that the transmitted wave comprises a sideband product of modulation which, with respect to the added unmodulated wave, alternately changes from the frequency position of an upper sideband to a lower sideband and vice versa, and in which the band of message frequencies is inverted with respect to said added unmodulated wave.

2. In a single sideband signaling system for attaining secrecy of transmission, including means to modulate carrier waves by message waves, the method comprising alternately changing the frequency of the carrier wave from one frequency to another by such an amount that the upper sideband product of modulation when one carrier frequency is supplied occupies substantially the same frequency band as the lower sideband product of modulation when the other of the two carrier frequencies is supplied, selecting said frequency band, and combining it with an unmodulated carrier wave of the same frequency as the carrier frequency not being used to produce the sideband, to produce a transmitted wave in which the components of the selected sideband product of modulation are in an inverted relation with reference to the combined unmodulated carrier wave regardless of which of said two frequencies of carrier wave is being used to produce the transmitted sideband product of modulation.

3. In a signaling system in which the transmitted wave comprises one sideband of a modulated carrier wave and an unmodulated wave of a frequency different from the modulated wave, the method comprising modulating a carrier frequency wave by a message input comprising a band of frequencies, alternately supplying to the modulator circuit a carrier wave of one frequency and replacing it with a carrier wave differing in frequency by an amount equal to the band width of the message input plus twice the value of the lowest frequency to be used from the message input, suppressing all products of modulation except a wave comprising a band of frequencies, the lower and upper limits of which respectively correspond with the sum of the lower carrier frequency wave plus the lowest and highest frequencies to be used from the message input, and combining said last-mentioned wave with a suitable amount of the unmodulated carrier frequency wave the alternate to that which was utilized in producing said last-mentioned wave to render the transmitted wave difficult to interpret.

4. In a single sideband signaling system including a source of message waves and sources of carrier frequency waves, means for attaining secrecy of transmission which comprises, means for modulating a carrier wave by a message wave comprising a band of frequencies, means for alternately providing to the modulating means two carrier wave frequencies which frequencies differ from each other by an amount equal to the band width to be transmitted plus twice the value of the lowest frequency to be used from the message input, common means for selecting from the output of the modulating means only a wave comprising a band of frequencies, the lower and upper limits of which are numerically equal to the lowest carrier wave frequency plus the lowest and highest frequency, respectively, to be utilized from the message input, means for supplying a false carrier wave to the said selected band in synchronism with the change in carrier wave supplied to the modulating means and taken from the source not concurrently supplying the modulating means, so that relative to the added false carrier wave the intelligence in the transmitted wave is inverted from its normal order and the said selected bond of frequencies alternately assumes the position of an upper or lower sideband with respect to the transmitted false carrier wave.

5. A signaling system providing secrecy of the transmitted signal and comprising a source of message energy, a plurality of sources of carrier current energy, a translation device for modulating said carrier current energy by said message energy to produce upper and lower sidebands and interconnecting circuits connecting said message source and one of said carrier current sources to said translation device, means for alternately controlling the frequency of the carrier current energy supplied from said connected source to said translation device so that the lower sideband frequency produced when one carrier frequency is modulated occupies substantially the same frequency band as does the upper sideband produced when the other carrier frequency is modulated, means connected to said translation device for selecting only the modulation product occupying said common frequency band, means for mixing with said outgoing selected frequencies an unmodulated carrier current wave from the other of said sources, and means for alternately controlling the frequency of said unmodulated wave at the same values but in reverse sequence to the frequency of said modulated carrier wave.

6. In the art of single sideband signaling for attaining secrecy of transmission and in which the transmitted electric wave comprises a first carrier frequency wave and an upper or lower sideband product of modulation between a second carrier frequency wave and a message wave, the method that comprises intermittently interchanging the first and second-mentioned carrier waves simultaneously to reverse the position of said sideband product of modulation from upper or lower to lower or upper with respect to the carrier wave being transmitted after such interchange and such that, in either position, the frequencies of the message wave are in inverted disposition with respect to said transmitted carrier wave.

7. A transmission system for attaining secrecy of the transmitted message, said system comprising, at a station of such a system, a message wave input and a message wave output circuit, at least two sources of carrier current differing in frequency, a unidirectional transmitting path comprising a first translation device and a first frequency discriminating device connected to said translation device, a unidirectional receiving path comprising a second frequency discriminating device and a second translation device connected to the output of said second discriminating device, means for alternately changing the frequency of the carrier current supplied from said sources to said first and second translation devices by such an amount that in said first translation device, the upper sideband produced when the carrier current has one of its two frequencies occupies substantially the same frequency band as is occupied by the lower sideband produced when the carrier current has the other of its two frequencies, said first and second frequency discriminating devices having passband characteristics selective only of wave frequencies in said same frequency band, means for adding to the frequency band selected by said first frequency discriminating device an unmodulated carrier current of the same frequency as that one of the two frequencies possessed by the carrier current concurrently not being modulated, so that the transmitted wave comprises a sideband product of modulation which, with respect to the added unmodulated carrier current, alternately changes from the frequency position of an upper sideband to a lower sideband and vice versa and in which the message frequency band is inverted with respect to said unmodulated carrier current, and means intermediate the output of said second translation device and said message output circuit for selecting only the lower sideband product of modulation from said second translation device.

8. In a signaling system for attaining secrecy of transmission and including a source of message waves and a plurality of sources of carrier waves, means for modulating a carrier wave with a message wave comprising a band of frequencies, means for alternately providing to the modulating means two carrier waves, the frequencies of which differ from each other by an amount such that the upper sideband product of modulation produced when the carrier wave has one of its two values occupies substantially the same frequency band as that occupied by the lower sideband produced when the carrier wave has the other one of its two frequencies, common frequency discriminating means for selecting from the output of the modulating means only wave frequencies in said last-mentioned frequency band, means for supplying to said selected wave frequencies an unmodulated wave having a frequency equal to that frequency of the carrier wave not utilized in producing said selected waves, so that the transmitted wave comprises an unmodulated carrier wave and a sideband product of modulation which alternately assumes, with respect to the supplied unmodulated carrier wave, the frequency position of an upper sideband and of a lower sideband, and in which the message frequencies are inverted relative to said supplied carrier wave, receiving means for selecting from the received portion of said transmitted wave, only wave frequencies in said above-mentioned frequency band common to said upper and lower sidebands, means for demodulating said last-mentioned selected frequencies with a carrier wave, and means for changing the frequency of said carrier waves supplied to said demodulating device by such an amount that the wave frequencies in the lower sideband so produced are substantially the same as and in substantially the same sequential order as were the wave frequencies in the original message wave.

9. A single sideband signaling system comprising means for supplying a message wave comprising a band of frequencies, a source of carrier waves of two different frequencies which are separated in frequency by an amount such that the upper sideband product of modulation which would be produced by modulating the carrier wave of one frequency with the message wave would occupy substantially the same frequency band as would the lower sideband product of modulation which would be produced by modulating the carrier wave of the other frequency with the message wave, means for modulating the carrier waves of either frequency with the message wave to produce upper and lower sideband products of modulation of said waves, means for impressing said message wave continuously on said modulating means, means for delivering said carrier waves of different frequencies in alternation to said modulating means, means for selecting from the output of said modulating means only that sideband product of modulation of each of said carrier waves and said message wave that occupies substantially the same frequency band, and means for adding to the wave frequencies comprising the selected sideband product of modulation the carrier waves of said different frequencies in alternation but in reverse sequence to that of the carrier waves supplied to said modulating means.

10. In a single sideband signaling system wherein secrecy is secured by transmitting along with an unmodulated false carrier wave of changeable frequency the message intelligence in the form of a sideband product of modulation in which the message frequencies are at all times in an inverted frequency relation with respect to said false carrier wave, and which alternately changes from the frequency position of an upper to a lower sideband, and vice versa, with respect to said false carrier wave, the combination of a source of message waves having a predetermined maximum band width of frequencies, a modulator continuously connected to said source, a first and a second oscillator the frequencies of oscillation of which differ by an amount that is equal to the predetermined maximum message band width plus twice the value of the lowest message frequency, switching means for alternately connecting to said modulator the outputs of said first and second oscillators, a filter connected to the output of said modulator, said filter having a pass-band the minimum value of which equals the sum of the lower of said oscillating frequencies plus the lowest message frequency and the maximum value of which equals the sum of the lower oscillating frequency plus the maximum message frequency, and switching means for adding to the band of frequencies selected by said filter the output of the oscillator that is currently disconnected from said modulator.

KENNETH L. KING.

REFERENCES CITED

The following references are of record in the file of this patent:

UNITED STATES PATENTS

| Number | Name | Date |
|---|---|---|
| 1,464,096 | Hartley | Aug. 7, 1923 |
| 1,592,940 | Kendall | July 20, 1926 |
| 1,624,601 | Horton | Apr. 12, 1927 |
| 1,762,984 | Heising | June 10, 1930 |
| 1,992,441 | Purington | Feb. 26, 1935 |
| 2,179,106 | Taylor et al. | Nov. 7, 1939 |
| 2,393,224 | Van Dissel | Jan. 15, 1946 |
| 2,405,599 | Mitchell | Aug. 13, 1946 |
| 2,407,260 | Dickieson | Sept. 10, 1946 |
| 2,411,206 | Guanella | Nov. 19, 1946 |